(No Model.)

T. S. MILLER.
SLATTED APRON CONVEYER.

No. 423,069. Patented Mar. 11, 1890.

Witnesses

Inventor
Thos. Spencer Miller,
By his Attorney E. G. Ewart.

UNITED STATES PATENT OFFICE.

THOMAS SPENCER MILLER, OF BROOKLYN, NEW YORK, ASSIGNOR TO THE LINK-BELT MACHINERY COMPANY, OF CHICAGO, ILLINOIS.

SLATTED-APRON CONVEYER.

SPECIFICATION forming part of Letters Patent No. 423,069, dated March 11, 1890.

Application filed November 18, 1889. Serial No. 330,679. (No model.)

*To all whom it may concern:*

Be it known that I, THOMAS SPENCER MILLER, a citizen of the United States, residing at Brooklyn, in the county of Kings and State of New York, have invented certain new and useful Improvements in Slatted-Apron Conveyers, of which the following is a specification.

My invention relates to improvements in those apron conveyers which are used for handling sticky material; and its objects are to facilitate the discharge of the material, stiffen the conveyer-slats, and permit the use of larger and stronger belting than could ordinarily be employed with the limited diameters of wheels often required. I attain these objects by the arrangements illustrated in the accompanying drawings, in which—

Figure 1:
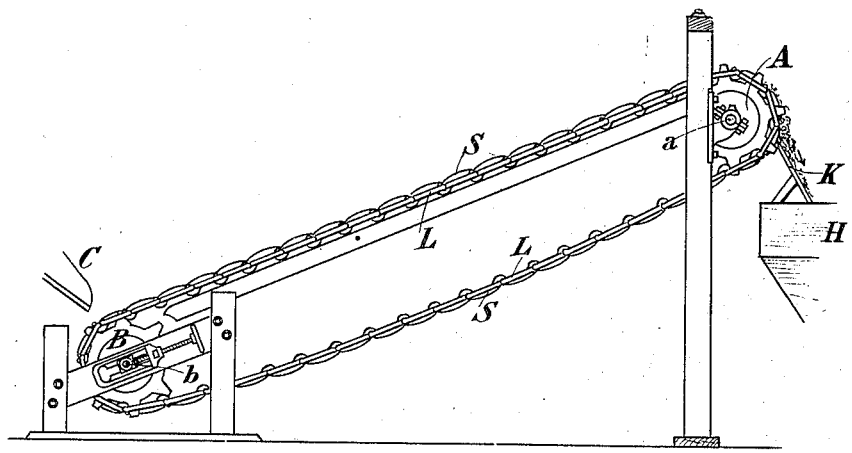
Figure 2:
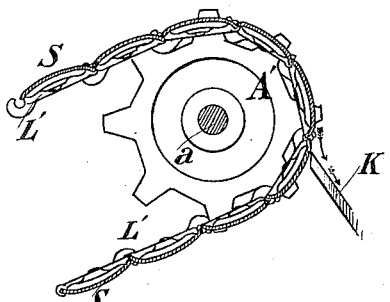
Figure 3:
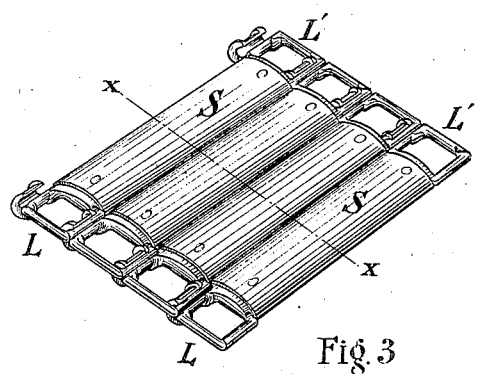
Figure 4:
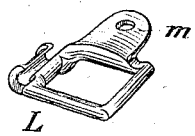

Figure 1 is a side elevation of a conveyer using my device. Fig. 2 shows a cross-section of the slats and scraper at the discharge end of a conveyer, as if the apron were cut transversely to the slats at some such line as $x\ x$ in Fig. 3, illustrating in the background the attachment portions of the links and one of the head-wheels. Fig. 3 is a perspective view of a short section of a slatted apron using my device, and Fig. 4 illustrates the adaptation of the attachment-link to use with the curved slat.

Similar letters refer to similar parts throughout the several views.

The conveyers are composed of two strands of linked belt connected by slats, and the view in Fig. 1 shows only one side of one of each pair of belts and wheels and one end of each slat.

L L' are links of the belting, to which the slats S S are fastened.

A in Fig. 1 is the nearer one of the pair of head-wheels of the conveyer, suitably mounted on shaft $a$. A' in Fig. 2 is the farther wheel of the pair on same shaft $a$.

B is one of the tail-wheels, suitably mounted on shaft $b$.

C is a chute delivering the load to the conveyer.

H is a hopper receiving the load from the conveyer.

K is a scraper suitably located and supported for cutting or scraping off whatever material may not discharge freely into hopper H.

$m$ in Fig. 4 is the attachment portion of the link L, made with curved upper surface for convenience in attaching the slat.

In the construction of conveyers for handling sticky materials—such as tempered clay for tile and brick manufacture—efforts have been made to use rubber or other flat belts, so that scrapers could be employed to free the material from the conveyer at the discharge end. These conveyers were often required for use in limited spaces, and flat belts running over small pulleys gave considerable trouble from slippage, and the belts themselves were of such material as to rot out soon under the influence of the moisture.

The substitution of slatted-apron conveyers composed of linked metallic belts connected by slats and running over sprocket-wheels partially overcame the difficulties, as a positive motion was secured, even with the use of small wheels, and the slats could be composed of a durable material.

The slatted conveyers were made with straight or flat slats either abutting or overlapping, and under the strains of the loads these slats were often bent so much as to cause them to interfere with each other in passing around the head and foot of the conveyer.

When the slats were arranged so that each overlapped the one behind it to prevent their catching on the scraper at the discharge end, trouble was experienced with the material in some of its conditions working into the openings between the slats in passing around the head of the conveyer, and accumulations of this sort would prevent the slats coming together again on the straight runs of the conveyer, and thus occasion more and more leakage through the apron; furthermore, the slats could not be scraped clean, as the surface presented to the scraper was prismatic or polygonal rather than cylindrical. To overcome these difficulties as far as possible, short pitch-links were used, so as to increase the number of slats in the limited space around the head-shaft and render less acute the angle of each slat with the one next to it and decrease the openings between overlapping slats. Short pitch-links, however, are made of comparatively light material, while these conveyers are frequently wanted for work requiring strong belts.

In the practice of my invention I employ slats with the upper surfaces curved substantially to suit the size of wheels used, so that the apron in passing around the head of the conveyer practically presents a smooth cylindrical surface easily scraped or cut clean, while at the same time in the case of metal slats the curving or corrugating of the slats very materially stiffens them and enables them to carry heavy loads without bending.

I have found that by placing one edge of each slat with the line of the edge coincident with the axis of articulation of the links and letting the other edge project under the adjacent slat I practically secure a continuous surface with little or no opening between the slats for accumulations or leakage in any relative position, whatever may be the angle between the slats, for the line of contact is constant and the partial revolution or hinging of the slats with reference to each other is always around this common central line of contact.

The above-described arrangements enable me to use broad slats, each of which may occupy, for instance, an eighth or a sixth of a cylinder whose diameter is practically equal to the pitch diameter of the head wheels of the conveyer. The use of broad slats permits the employment of longer pitch-links, which in turn can be made stronger than short pitch-links, and the conveyers may thus be adapted to places where they could not before be used, while their efficiency is increased in ordinary locations.

It is evident that the objects of my invention could be obtained by the use of slats composed of other material than metal, and that the shape or style of linked belt and attachment-links may be varied. The application of my invention is also unaffected by the question whether the apron is supported by carrying idlers or rollers or slides on carrying ways or is allowed to hang without support.

Having thus fully described my invention, what I claim, and desire to secure by Letters Patent, is—

1. In a slatted-apron conveyer, slats with upper surfaces curved substantially to the circle of the circumference of the wheels at the discharge end, in combination with a scraper for removing adhesive material, substantially as described.

2. A slatted-apron conveyer provided with curved slats having their lines of contact coincident with the lines of the axes of articulation of their respective links, substantially as set forth.

THOS. SPENCER MILLER.

Witnesses:
C. D. BUTLER,
CHAS. M. NORTH.